US009633032B2

(12) United States Patent
Stoakes et al.

(10) Patent No.: US 9,633,032 B2
(45) Date of Patent: Apr. 25, 2017

(54) OBJECT SYNTHESIS

(75) Inventors: Timothy Stoakes, Humburg Scrub (AU); Andrew Leppard, Unley (AU)

(73) Assignee: Quantum Corporation, San Jose, CA (US)

( * ) Notice: Subject to any disclaimer, the term of this patent is extended or adjusted under 35 U.S.C. 154(b) by 626 days.

(21) Appl. No.: 13/459,295

(22) Filed: Apr. 30, 2012

(65) Prior Publication Data

US 2013/0290275 A1    Oct. 31, 2013

(51) Int. Cl.
*G06F 7/00* (2006.01)
*G06F 17/00* (2006.01)
*G06F 17/30* (2006.01)
*G06F 13/14* (2006.01)

(52) U.S. Cl.
CPC .............................. *G06F 17/30156* (2013.01)

(58) Field of Classification Search
CPC ........... G06F 11/1453; G06F 17/30156; G06F 3/0641; G06F 2201/84; G06F 17/505
USPC ....... 707/99.204, 999.2, 564, 640, 644, 646, 707/647, 696, 698, 693, E17.005, 692; 704/258
See application file for complete search history.

(56) References Cited

U.S. PATENT DOCUMENTS

| | | | | |
|---|---|---|---|---|
| 2010/0333116 | A1* | 12/2010 | Prahlad | G06F 17/3002 719/328 |
| 2011/0161297 | A1* | 6/2011 | Parab | G06F 17/30156 707/646 |
| 2012/0185447 | A1* | 7/2012 | Zhang | G06F 17/30156 707/693 |
| 2013/0138613 | A1* | 5/2013 | Paulzagade | G06F 11/1458 707/647 |

* cited by examiner

*Primary Examiner* — Usmaan Saeed
*Assistant Examiner* — Cecile Vo
(74) *Attorney, Agent, or Firm* — Eschweiler & Potashnik, LLC (57) ABSTRACT

Apparatus, methods, and other embodiments associated with object synthesis are described. One example apparatus includes logic for identifying a block in a data de-duplication repository and for identifying a reference to the block. The apparatus also includes logic for representing a source object using a first named, organized collection of references to blocks in the data de-duplication repository and logic for representing a target object using a second named, organized collection of references. The apparatus is configured to synthesize the target object from the source object. Since synthesis may be complicated by edge cases, the apparatus is configured to account for conditions including a block in the target object needing less than all the data in a source object block, data to be used to synthesize the target object residing in a sparse hole in a data stream, and the target object needing data not present in the source object.

14 Claims, 8 Drawing Sheets

OBJECT SYNTHESIS

BACKGROUND

Data de-duplication systems may parse an incident data stream into blocks. Data de-duplication systems may also compute an identifier for a block. The identifier may be referred to, for example, as a fingerprint. Data de-duplication systems may hash blocks to produce hash values that may serve as the identifier/fingerprint. Conventional data de-duplication approaches may parse a larger block of data into smaller blocks of data and then produce hopefully unique fingerprints for the blocks. The fingerprints are only "hopefully" unique because when the fingerprint is produced using a hash function there may be a possibility of a hash collision. In some conventional systems, parsing the larger block into smaller blocks may include finding block boundaries using a rolling hash. Unique blocks may be stored in a block repository.

This general picture of conventional data de-duplication may be complicated by special cases encountered while ingesting an incident data stream, while producing output blocks or information about output blocks, while storing blocks, and at other times. One example complication involves an artificial maximum block size that may need to be imposed to prevent pathological behavior during ingest. Reaching a maximum block size may force a block boundary to be placed even though the rolling hash did not indicate a desired block boundary. Another complication arises when an incident data stream includes both metadata that is not to be de-duplicated and data that is to be de-duplicated. This complication may be handled by removing application metadata from the incident data stream before parsing the data stream. Yet another complication may arise when an incident data stream is presented out-of-order. Processing the out-of-order data stream may create potentially transient, sparse holes in an output data stream. Another complication may arise when data that has already been stored at a given stream offset may inadvertently be overwritten.

Academic and theoretical discussions of de-duplication systems may not consider the realities of these complications and thus may not present a completely accurate picture of the disjoint, incomplete, and/or out-of-order outputs that may be present in data de-duplication systems and the additional processing performed to handle edge cases produced by these complications.

Fingerprinting a block may include performing a block-wide hash. Parsing a block into potentially smaller blocks and then fingerprinting the potentially smaller blocks using, for example, the MD5 hash, facilitates storing unique blocks and not storing duplicate blocks. Instead of storing duplicate blocks, smaller representations of stored blocks can be stored in file representations, object representations, and other data representations. Thus a de-duplication system ends up treating what was a single larger item (e.g., file, object) as a collection of smaller pieces (e.g., blocks). Additionally, de-duplication systems generally produce references (e.g., pointers) to the smaller pieces.

Conventional de-duplication systems achieve significant reductions in the storage footprint of data by storing just the unique blocks, storing the smaller representations of duplicate blocks, and generating organized collections (e.g., lists) of references (e.g., pointers) to sets of unique blocks needed to recreate an original item. To consume an even smaller data footprint, conventional de-duplication approaches may compress the potentially smaller blocks after they have been parsed out of the larger block. For security reasons, conventional de duplication approaches may encrypt blocks and/or information about blocks.

Once unique blocks and information about the unique blocks have been stored, it may be straightforward to recreate items represented by collections of unique blocks. However, data de-duplication systems may also synthesize new items from existing items. For example, a data de-duplication system that contains a full backup and a set of incremental backups may be able to create a synthetic full backup by splicing together pieces of the full backup, pieces of the incremental backup, and perhaps new data. Data de-duplication systems may create synthetic backups without reading and writing all the data needed for the backup. Instead of reading all the data from the various locations in which it is stored and then writing all the data to a single location, systems may create a synthetic backup by creating a new set of pointers or references to stored things. This may reduce and in some cases even eliminate reading and writing during synthetic backup creation.

While synthetic backups have been described academically and/or theoretically, the realities described above that complicate data de-duplication (e.g., out-of-order ingest, compression, encryption) may similarly complicate synthetic backups. While synthetic backups are described, more generally data de-duplication systems may support fabricating a new entity from components of existing entities. Even more generally, systems that treat data as a collection of smaller pieces and that include references to those smaller pieces may be susceptible to sub-optimal results due to the realities described above. The sub-optimal results may occur at the time of fabricating the new entity.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Example systems and methods concern object synthesis. A target object may be synthesized from a source object that is, for example, an object processed by a data de-duplication apparatus or method. Ingesting data into a de-duplication system involves establishing and organizing pointers to unique blocks of data. More generally, processing data in a de-duplication system involves processing information about unique pieces of data. To facilitate recreating a larger item from the potentially smaller unique blocks of data, collections of pointers to unique blocks of data are organized and named for future reference. The named, organized collection of blocks may be referred to as a blocklet. The name of the collection may be referred to as its "tag".

Example systems and methods facilitate efficiently synthesizing new items from existing items. In one embodiment, a new organized collection of references (e.g., pointer list) associated with a synthesized item can be created from references (e.g., pointers) to existing sub-items (e.g., blocks). In another embodiment, a new pointer list associated with a synthesized item can be created by specifying sub-ranges of other existing pointer lists. In yet another embodiment, a new item can be fashioned from new data for which a pointer list may not be available and from a new pointer list that specifies sub-ranges of existing pointer lists. In yet another example, fabrication may include a hybrid approach where new references to new data are added to existing references that were copied into the new pointer list.

Example systems and methods may support applications including, but not limited to, inline de-duplication, storage-layout aware de-duplication, storage-layout aware cloning, snapshot/replay, and de-duplication "defragmentation". A snapshot application may facilitate capturing information about a set of tags at a point in time and a replay application may facilitate recreating or displaying entities associated with the set of tags captured during the snapshot. De-duplication defragmentation refers to a process where pieces of data may be cut apart and stitched together in new patterns to create new entities that have the same content as a previous entity but whose arrangements provide superior performance for different uses. De-duplication defragmentation may involve a normalization process. The stitching and defragmentation may result in the replacement of a first larger corpus of blocks that did not de-duplicate all that well with a second smaller corpus of blocks that de-duplicated better.

Figure 1:
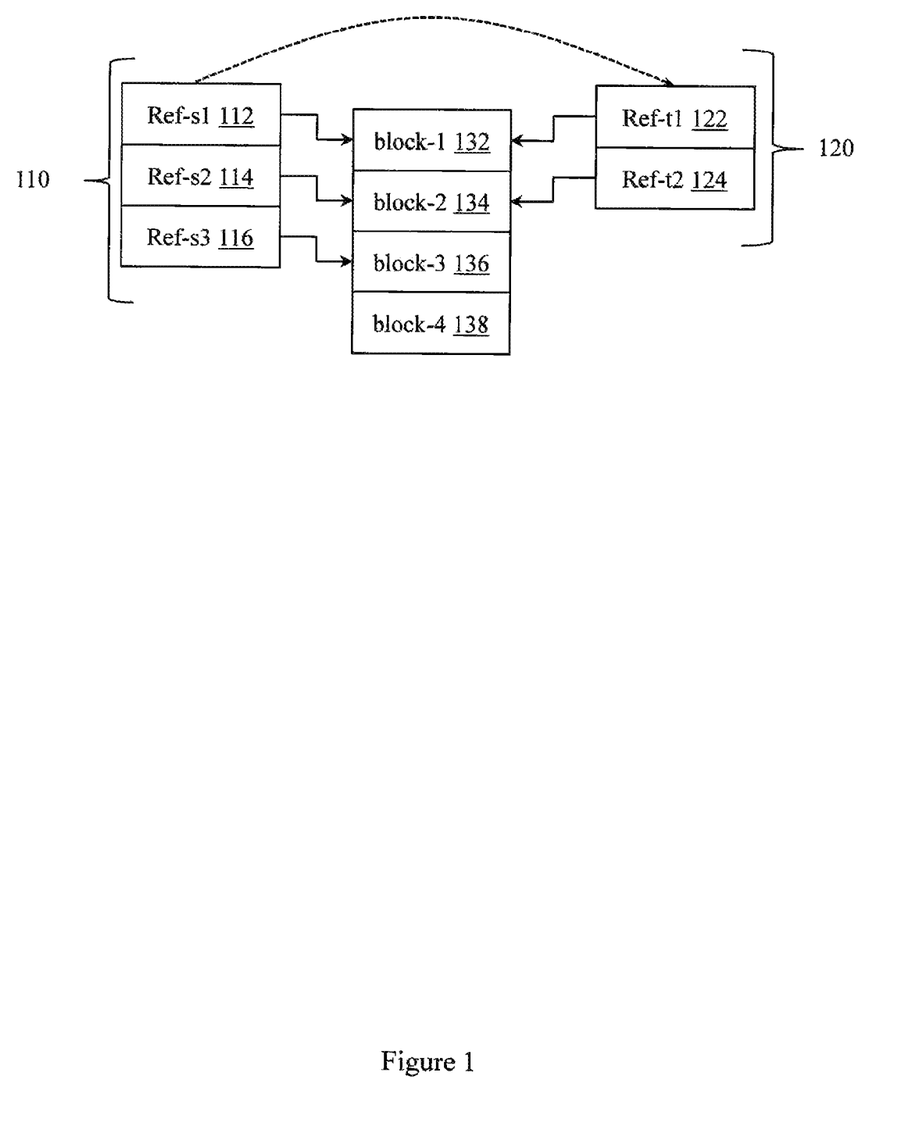
FIG. 1 illustrates an example object synthesis.

In one example illustrated in FIG. 1, a new (e.g., target) collection of references 120 can be built by copying references from an existing (e.g., source) collection(s) of references 110. For example, a new pointer list can be built by copying pointers from existing pointer lists. In FIG. 1, a source representation 110 includes references ref-s1 112, ref-s2 114, and ref-s3 116 which point to block-1 132, block-2 134, and block-3 136 respectively. A block-4 138 is unreferenced. A new target representation 120 of a new target object can be synthesized by copying pointers from source representation 110 to target representation 120. For example, pointer ref-s1 112 may be copied to target representation 120 as ref-t1 122. Target representation 120 may also include reference ref-t2 124. Note that after the copy, block-1 132 is referred to by two references instead of one. Therefore example apparatus and methods may manage lifecycle data (e.g., reference counts) for block-1 132 after determining that block-1 132 was involved in the synthesis. In FIG. 1, the target representation 120 needs less than all the references in source representation 110. In FIG. 1, the two blocks needed correspond exactly between the source object and the target object and thus edge cases are not encountered.

Figure 2:
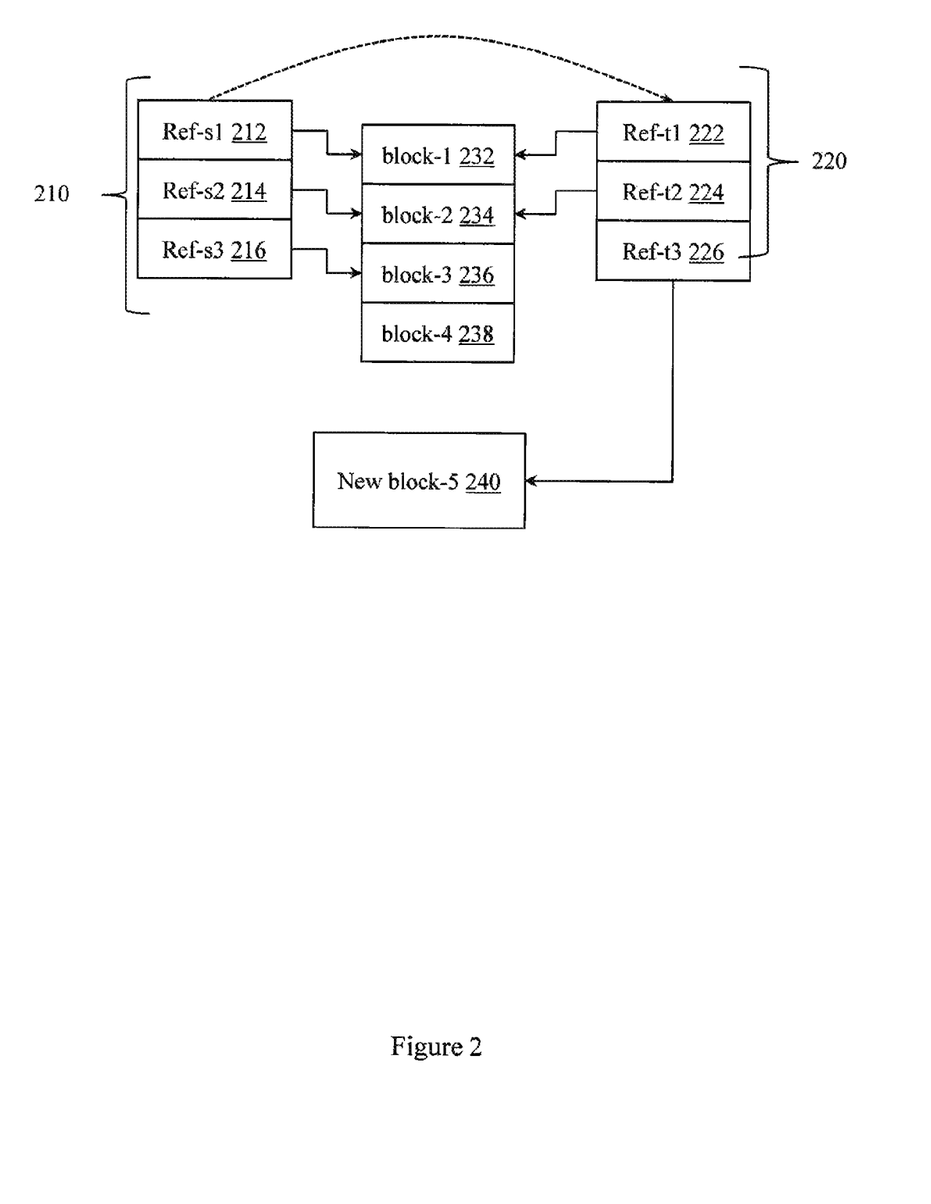
FIG. 2 illustrates an example object synthesis.

In another example illustrated in FIG. 2, a new (e.g., target) collection of references 220 can be built by copying pointers from existing (e.g., source) pointer lists 210 and by adding newly created reference entries. In FIG. 2, a source representation 210 includes references ref-s1 212, ref-s2 214, and ref-s3 216 which point to block-1 232, block-2 234, and block-3 236 respectively. A block-4 238 is unreferenced. Like FIG. 1, target representation 220 is established using a copy of a reference from source representation 210. For example, ref-t1 222 is a copy of ref-s1 212. Ref-t2 224 may be processed similarly. Unlike FIG. 1, target representation 220 includes a ref-t3 226 that points to a new block, block-5 240. Thus target representation 220 is a representation of a hybrid synthetic object that is partially synthesized from existing data and references and partly newly created. The appearance and use of new block-5 240 may lead to making a decision about manipulating the parse context in use by a de-duplication apparatus or process that is processing the blocks and references associated with source representation 210 and target representation 220. In one example, a previous parse context may be remembered and applied. In another example, the parse context may be reset to a default state. The "parse context" refers to items including, but not limited to, a current position in an incident data stream, a rolling hash value, a pre-determined condition being evaluated, a pattern being sought, progress towards a pattern being sought, and progress towards a maximum sized block.

In another example, a new (e.g., target) collection of references can be built by adding newly created reference entries to the new collection. The newly created reference entries may be produced, for example, while ingesting data. The different approaches to creating a target object may experience different conditions that challenge efficiency and correctness.

As described above, real-life de-duplication systems may encounter complicating conditions. One complication may arise when the data to be referenced by the target reference does not start at the beginning of a source location pointed to by a source reference. In this case, there may be data at the start of the source element that is not needed for the synthesized item. A similar complication may arise when the data to be referenced by the target reference does not end at the end of a source location pointed to by a source reference. Another similar complication may arise when a target element only requires a portion of a source element. In these examples, where the source element is not identical to the target element, the source element may selectively be transformed into a suitable target element.

Figure 3:
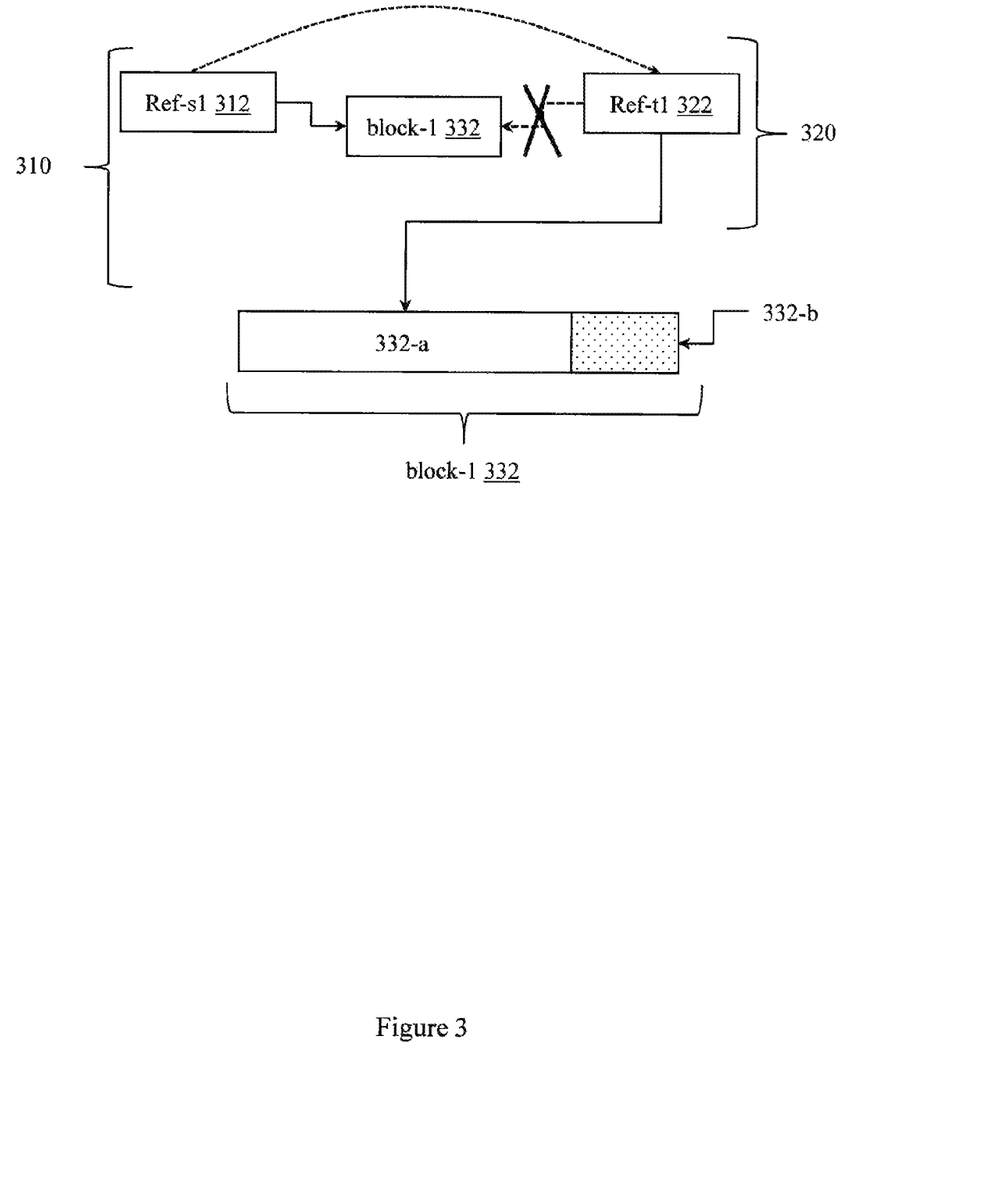
FIG. 3 illustrates an example object synthesis.

One example where a target block does not need all the data in a source block is illustrated in FIG. 3. In FIG. 3, a source representation 310 includes a reference ref-s1 312 that is associated with a block-1 332. If the block-1 332 was needed exactly as is for the target object then target representation 320 could be manipulated by simply copying the ref-s1 312 to the ref-t1 322. However, in the example illustrated in FIG. 3, block-1 332 may include data that is not needed for the target object. By way of illustration, a target object may need a portion 332-a of block-1 332 but may not need a portion 332-b of block-1 332. Example apparatus and methods may handle this situation in different ways, In one example, transforming a source element may include reading just the data required from the source element and then writing out just the data required from the source element data into a suitable target element. In another example, transforming a source element may include masking out unnecessary or undesired data in the source element. The masking may be performed physically by, for example, over-writing unnecessary data or virtually by, for example, annotating the target reference with start/end, include/exclude information. After either transformation, the resulting data could be reprocessed. Reprocessing the resulting data could include, for example, reading and re blocking the data. Reprocessing the resulting data could also include, for example, ingesting/re-parsing/re-de-duplicating the resulting data. Either type of reprocessing has an associated cost (e.g., processing time, memory consumption). Thus, a decision may be made after transformation to determine whether to re-process the resulting data, whether to include the resulting data as new items that can referenced, or whether to take other actions based on factors including available processing time, available transmission bandwidth, available memory, and other factors. Treating the resulting data as new items that can be referenced may decrease storage efficiency because duplicate data is stored. Under different circumstances the tradeoff between storage space and computing time may be resolved in different ways. In one embodiment, rather than transform the source data, the target reference may include an annotation that describes the portion(s) of the source data to include. For example, while a source reference may simply identify source data (e.g., a unique block), a target reference may identify not just a block, but also the start point of a portion(s) of the block that is associated with the reference.

Figure 8:
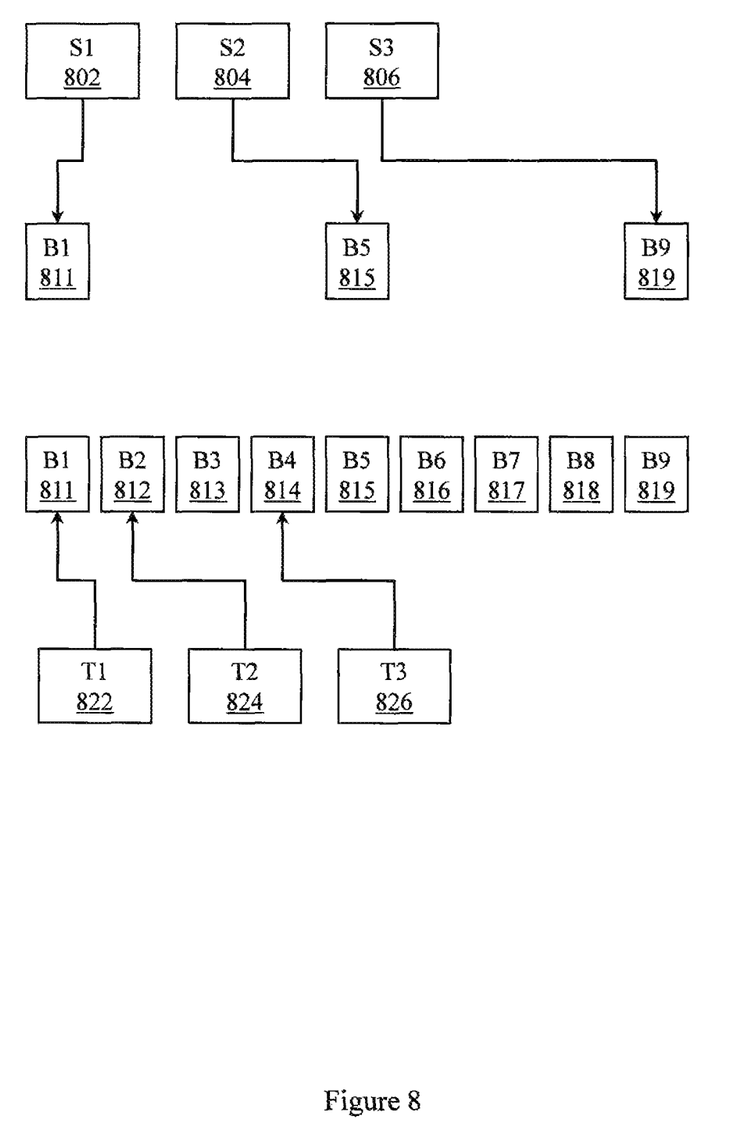
FIG. 8 illustrates an example object synthesis.

A third complication may arise when the source location is located in a sparse 'hole' in the source stream. The hole may appear due, for example, to processing an input source stream out-of-order, as may occur when the source stream is presented across a packet-switching network. Holes may appear for other reasons. In some situations the presence of sparse holes may be undesirable while in other situations the presence of sparse holes may be desired. Therefore, when creating the synthesized object, it may be desirable to address the existence of the hole to either avoid replicating the hole and thus compounding the effects of the hole or to enhance the hole to maintain the desirable feature of the hole. In one embodiment, whose results are illustrated in FIG. 8, the target reference may be crafted to reduce the size of the sparse hole. In another embodiment, the target reference may be crafted to eliminate the sparse hole. In yet another embodiment, the target reference may be crafted to preserve and/or enhance the hole.

In FIG. 8, a first set of source pointers S1 802, S2 804, and S3 806 may point to blocks B1 811, B5 815, and B9 819. The blocks B1 811, B5 815, and B9 819 may be encountered during an out-of-order presentation of an incident data stream. While some de-duplication may be achieved even in the out-of-order situation, there may be sub-optimal performance in areas including, for example, spatial locality between blocks. Some data that may later be available and useful may actually reside in a sparse hole in the incoming data stream. At some later point in time, a different set of blocks may be available. The different set of blocks may provide an opportunity to address the sparse hole. Thus, when a target object is synthesized using the source representation, an opportunity may exist to achieve a more optimal performance in an area like spatial locality or in areas like reducing, preserving, or enhancing the size of a sparse hole, or other areas.

In FIG. 8, three target pointers T1 822, T2 824, and T3 826 point to blocks B1 811, B2 812, and B4 814 respectively. The target object is synthesized partially from the source representation and partially from other information that facilitates reducing, preserving, or enhancing the size of the hole.

A fourth complication may arise when the references associated with the synthesized item include references to data for which references did not exist in the source references. This complication may occur when new data is inserted for the partially synthesized item. This new data could be produced by a parsing and de-duplication process. The parsing and de-duplication processes that occur at the time that the new data is processed may be subject to a different parsing context than what existed when the data referenced by the existing references (e.g., in the source references) was parsed and de-duplicated. In one embodiment, to mitigate issues associated with different parsing contexts, information about a parsing context existing when the source references were generated may be used to control parsing of the new data. In another embodiment, a current parsing context, which may be irrelevant to or counter-productive to parsing the new data, may be reset. The current parsing context may be irrelevant or counter-productive because the new data will be associated with data parsed under a different context that has diverged from the context previously used. The divergence between a freshly reset context and the old context may be less than the divergence between the old context and the current context. Therefore resetting the parsing context may produce performance improvements (e.g., higher speed). In yet another example, an input stream may be "unwound" in an attempt to re-produce the parsing context. The choice of approaches may be made based, at least in part, on factors including, but not limited to, the history of discontiguities in this stream, instantaneous and/or historical performance information for the machine, instantaneous and/or historical resource utilization for the machine, and other factors.

Handling the four complications may lead to new data being inserted into a data repository. Handling the four complications may also lead to some data in the repository being referenced by one or more additional pointers. Handling the four complications may also lead to some data being de-referenced if, for example, it has been added to the repository in a different form. Example systems and methods may therefore manage the lifecycle of this data by, for example, manipulating reference counts or other lifecycle management data associated with a block.

The following includes definitions of selected terms employed herein. The definitions include various examples and/or forms of components that fall within the scope of a term and that may be used for implementation. The examples are not intended to be limiting. Both singular and plural forms of terms may be within the definitions.
ASIC: application specific integrated circuit.
CD: compact disk.
CD-R: CD recordable.
CD-RW: CD rewriteable.
DVD: digital versatile disk and/or digital video disk.
I/O: input/output
LAN: local area network.
PCI: peripheral component interconnect.
PCIE: PCI express.
RAM: random access memory.
DRAM: dynamic RAM.
SRAM: synchronous RAM.
ROM; read only memory.
PROM: programmable ROM.
USB: universal serial bus.
WAN: wide area network.
PPP: Point-to-Point protocol References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium", as used herein, refers to a non-transitory medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
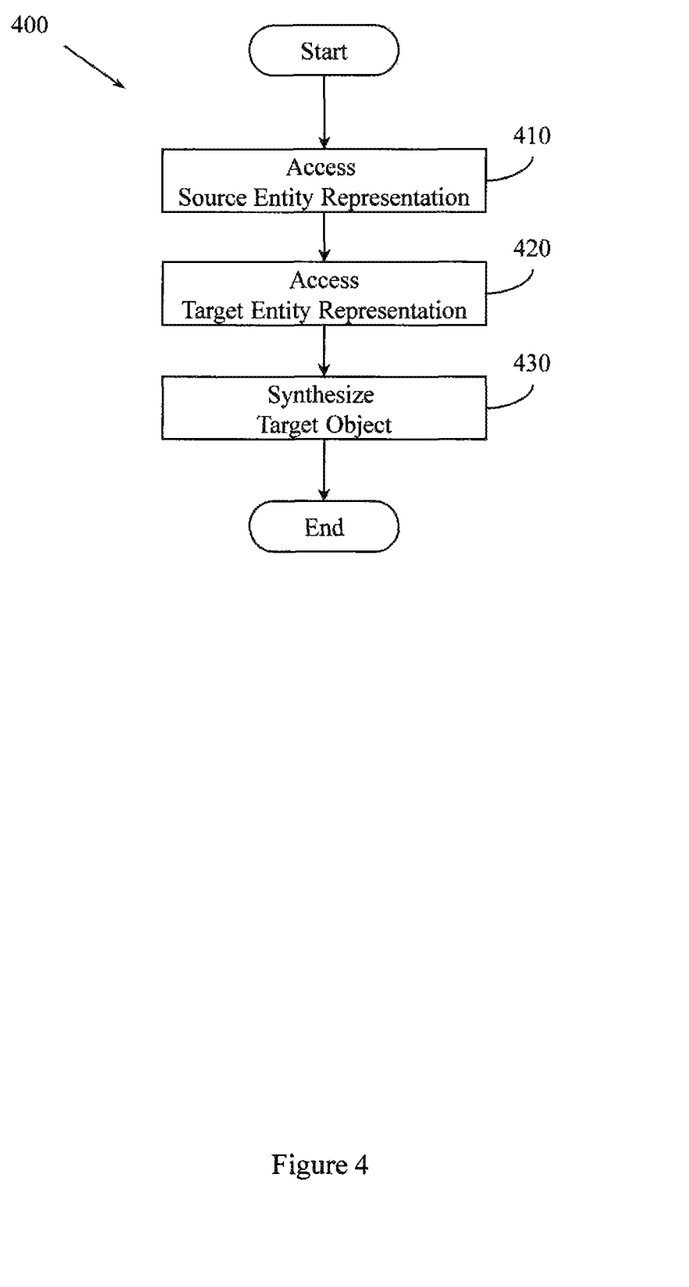
FIG. 4 illustrates an example method associated with object synthesis.

FIG. 4 illustrates a method 400 associated with object synthesis. Method 400 may include, at 410, accessing a source entity representation. In one example, the source entity includes one or more blocks processed by a data de-duplication process and stored in a block repository. In one example, the representation of the source entity comprises a first named, organized collection of references to blocks produced by the data de-duplication process. The source entity may be, for example, a file that was de-duplicated. The representation of the source entity may be, for example, a named (e.g., tagged) collection of references used to view or recreate the file. In one example, the representation of the source entity includes a list of pointers to blocks stored in block repository. While a list is described, one skilled in the art will appreciate that other organizations of references or pointers may be employed.

Accessing the source entity representation at 410 may include, for example, receiving data that comprises the representation, receiving a pointer to data that comprises the representation, receiving a signal that a known location (e.g., buffer) that stores a representation that is ready for processing, and other actions. The representation may have been produced, for example, by a data de-duplication apparatus or process. The data de-duplication apparatus or process may have identified blocks and references to blocks and then organized the references into a named, organized collection of references.

Method 400 may also include, at 420, accessing a target entity representation. In one example, a representation of the target entity is a second named, organized collection of references to blocks produced by the data de-duplication process. In one example, the representation of the target entity includes a list of pointers to blocks stored in the block repository.

Accessing the target entity representation at 420 may include actions similar to accessing the source entity representation at 410. In one example, accessing the target entity representation may include requesting memory to be allocated for the pointers and metadata that will comprise the representation, and may also include instantiating a data structure associated with the target entity representation. In one example, the target entity representation may be located on the same physical or virtual machine as the source entity representation. In another example, the target entity representation may be located on a different physical or virtual machine than the source entity representation. The source entity may also be referred to as a source object and the target entity may also be referred to as a target object.

Method 400 may also include, at 430, controlling a computer to synthesize the target entity. In one example, synthesizing the target entity from the source entity includes manipulating the representation of the target entity. Manipulating the representation of the target entity may include, for example, copying a reference or pointer from the representation of the source entity to the representation of the target entity. While copying is described, one skilled in the art will appreciate that an exact copy may not be made and that a target representation reference may include more, less, or exactly the same data as a source representation reference. One skilled in the art will also appreciate that pointers may not need to be copied one-by-one and that a representation may not include a pointer to every block associated with the source object. When a source object includes adjacent blocks, then multiple blocks may be referred to using a single pointer. Thus, in one example, a target object may be synthesized by copying source reference information that refers to multiple blocks including, for example, runs of contiguous blocks.

Method 400 may be performed at different times by different machines functioning in different roles and performing different processes. The processes being performed by the computer can include, but are not limited to, an inline data de-duplication process, a post-processing data de-duplication process, a storage layout aware data de-duplication process, a storage layout aware cloning process, a storage layout aware replication process, a snapshot/replay process, and a de-duplication defragmentation process.

In one example, a method may be implemented as computer executable instructions. Thus, in one example, a non-transitory computer-readable medium may store computer executable instructions that if executed by a machine (e.g., processor) cause the machine to perform method 400. While executable instructions associated with method 400 are described as being stored on a computer-readable medium, it is to be appreciated that executable instructions associated with other example methods described herein may also be stored on a computer-readable medium.

Figure 5:
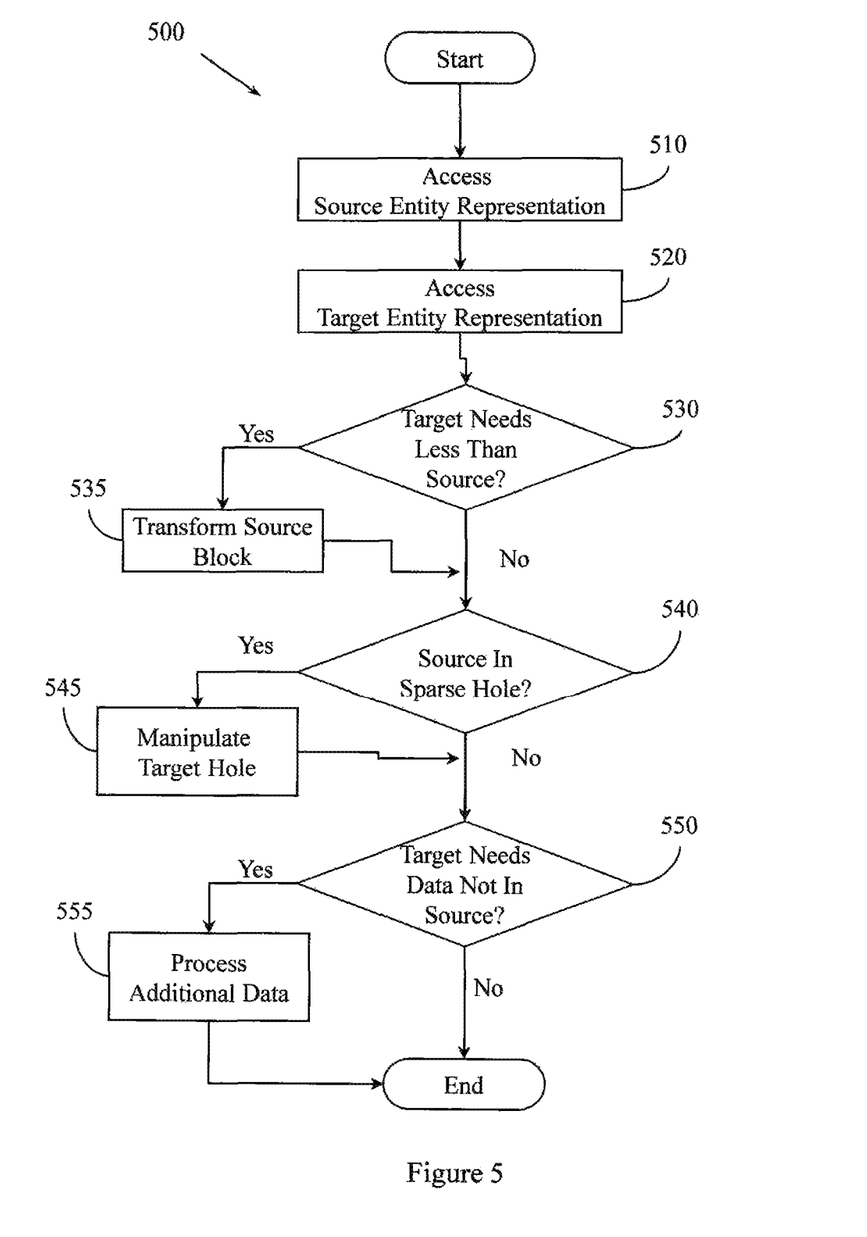
FIG. 5 illustrates an example method associated with object synthesis.

FIG. 5 illustrates a method 500 associated with object synthesis. Method 500 includes several actions similar to those described in connection with method 400 (FIG. 4). For example, method 500 includes accessing a source entity representation at 510 and accessing a target entity representation at 520.

Method 500 includes, at 530, making a determination concerning whether a target element needs less than all the data available in a source element. By way of illustration, a pointer in a source object representation may point to a block that has 16 k of data. The target object being synthesized may not need all 16 k of the data. Thus, rather than automatically copying the source element pointer to the 16 k block, additional processing may be undertaken.

If the determination at 530 is that the target does not need less than the source, then processing continues at 540. If the determination at 530 is that the target does need less than the source, then processing may continue at 535. The processing at 535 follows the determination that a source element referred to by a reference to be copied from the representation of the source entity to the representation of the target entity includes data that is not needed in the target element. One action performed at 535 can include controlling the computer performing method 500 to create a new block from just the data needed from the source element to synthesize the target element. Another action performed at 535 can include controlling the computer to provide a reference to the new block for use in synthesizing the target entity. Another action performed at 535 can account for the mismatch between data in a source block and data needed for a target block by controlling the computer to annotate a target reference. The annotation may describe which data in the source block is needed and which data in the source block is not needed. The annotation or other manipulations of the target reference may be configured to logically remove the data from the source element from the point of view of the target element.

When a new block is created, method 500 may selectively control the computer to either store the new block in the block repository or to reparse the data that would be used to create the new block. The decision about whether to store the new block, which would increase duplicated data, or to reparse the data, which would increase processing time, may be made as a function of data associated with, but not limited to, an ingest speed associated with the data de-duplication process, a storage efficiency read-back speed associated with the data de-duplication process, a type of data being processed by the data de-duplication process, and a stability of data being processed by the data de-duplication process. The "stability" of data being processed refers to the 'lifetime' of the data in that form. For example, if it is known that data that is being written in a non-linear or fragmented way will have a short life because it will soon, for example, be deleted, or transformed through some normalization process, then this process may not need to try very hard to be efficient. However, if it is known that data that is being written will live for a long time in its written form, then this process may expend more effort writing the data in a desired format the first time.

In another example, a decision may be made based on the recent "shape" of input/output. For example, if input/output has recently been fragmented and/or non-linear in either time or space, then it may be likely that it will continue to be. Therefore, fewer resources may be expended at this time to arrange the data. However, if the input/output has been sequential to a certain degree, then it may be likely that an instant non-linearity is an anomaly and thus resources may be expended to account for the anomaly in the otherwise desirable arrangement. In yet another example, a decision may be based on resource (e.g., memory, processing power) available. The amount of effort made may be proportional to the available resources.

Method 500 also includes, at 540, making a determination of whether a source location in a source stream from which data used to synthesize the target entity will be copied is located in a sparse hole. If the determination at 540 is no, then processing proceeds at 550. If the determination at 540 is yes, then processing continues at 545, where the target element is synthesized so that a hole associated with the target entity will be smaller than the sparse hole in the source stream. In one embodiment the hole associated with the target entity may be preserved and/or enhanced.

Method 500 also includes, at 550, determining whether the target entity needs data that cannot be found using references in the source entity. If the determination at 550 is no, then processing can conclude. If the determination at 550 is yes, then processing may continue at 555. When the target entity needs data that cannot be found in the source entity, then method 500 may, at 555, manipulate the representation of the target entity by adding at least one reference not found in the representation of the source entity. The reference may be associated with a block that is not referred to by the representation of the source entity. In this case, the block may have been added from newly processed data.

When data for a target entity includes synthetic data (e.g., data referenced by the source entity) and new data (e.g., recently de-duplicated data), then a mismatch between the parse contexts present at different times may exist. For example, the parse context present while the new data is being de-duplicated may not be consistent with the parse context present when the data referenced by the source element was de-duplicated. Therefore an action performed at 555 may include selectively manipulating a parse context in use by the de-duplication process. In one example, the parse context may be reset to a default state. In another example, the parse context in use at the time the de-duplication process processed a block associated with the source entity may be recalled and applied. In yet another example, an attempt to recreate the parse context may be made by rewinding the ingest stream by an amount.

In one example, a target object may be synthesized without reading or writing data in existing blocks. However, synthesizing the target object may still involve existing blocks. For example, an existing block may be examined to determine if it is over or under inclusive of data needed for a target block. If a block is used in the synthetic object, then the life cycle of that block may be changed. For example, the source object may no longer be needed and may be discarded. If blocks that were used to synthesize a target object are deleted when the source object is deleted, then the target object may become invalid or otherwise unusable. Therefore method 500 may also include, upon determining that a block in the block repository was involved in synthesizing the target element, selectively managing a life cycle attribute associated with the block. Selectively managing the life cycle attribute may include, for example, altering a reference count for the block.

While FIG. 5 illustrates various actions occurring in serial, it is to be appreciated that various actions illustrated in FIG. 5 could occur substantially in parallel. By way of illustration, a first process could transform a source block, a second process could manipulate a hole, and a third process could process additional data. While three processes are described, it is to be appreciated that a greater and/or lesser number of processes could be employed and that lightweight processes, regular processes, threads, and other approaches could be employed.

Figure 6:
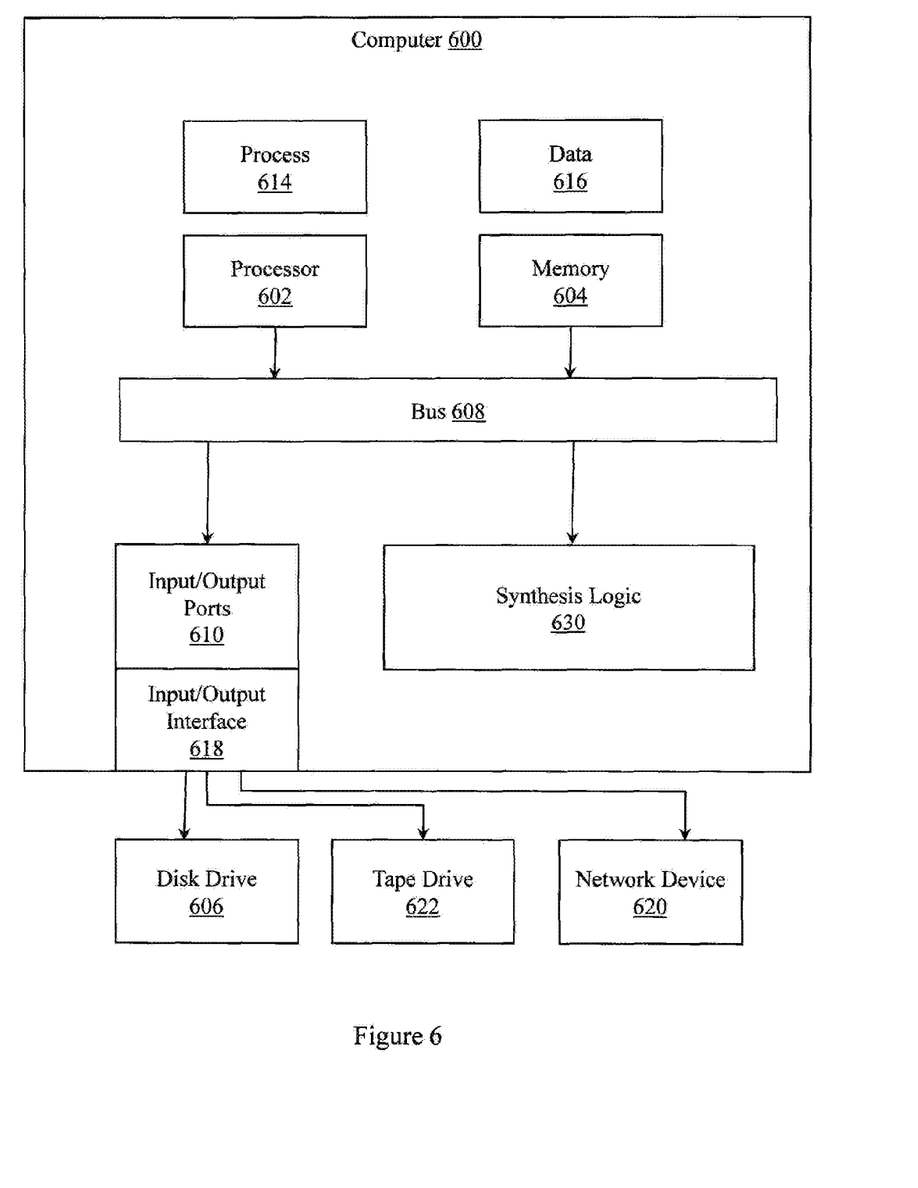
FIG. 6 illustrates an example computing environment in which example apparatus, systems, methods, and, equivalents, may operate.

FIG. 6 illustrates an example computing device in which example systems and methods described herein, and equivalents, may operate. The example computing device may be a computer 600 that includes a processor 602, a memory 604, and input/output ports 610 operably connected by a bus 608. In one example, the computer 600 may include a synthesis logic 630 configured to synthesize a target object from a source object. In different examples, the logic 630 may be implemented in hardware, software, firmware, and/or combinations thereof. While the logic 630 is illustrated as a hardware component attached to the bus 608, it is to be appreciated that in one example, the logic 630 could be implemented in the processor 602.

Logic 630 may provide means (e.g., hardware, software, firmware) for identifying a block in a data de-duplication repository. Logic 630 may also provide means (e.g., hardware, software, firmware) for identifying a reference to a block in a data de-duplication repository. Logic 630 may also provide means for means for representing a source object using a first named, organized collection of references to blocks in the data de-duplication repository and for representing a target object using a second named, organized collection of references to blocks in the data de-duplication repository. Logic 630 may also provide means for synthesizing the target object from the source object. The means for synthesizing is configured to account for a plurality of conditions including, but not limited to a condition where a block in the target object needs less than all the data in a block in the source object, a condition where data to be used to synthesize the target object resides in a sparse hole in a data stream, and a condition where data to be used to synthesize the target object is not present in the source object.

The means associated with logic 630 may be implemented, for example, as an ASIC programmed to perform this special purpose programming. The means may also be implemented as computer executable instructions that are presented to computer 600 as data 616 that are temporarily stored in memory 604 and then executed by processor 602.

Generally describing an example configuration of the computer 600, the processor 602 may be a variety of different processors including dual microprocessor and other multi-processor architectures. A memory 604 may include volatile memory and/or non-volatile memory. Non-volatile memory may include, for example, ROM, PROM, and other examples. Volatile memory may include, for example, RAM, SRAM, DRAM, and other examples.

A disk drive 606 or tape drive 622 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM drive, a Blu-Ray drive, an HD-DVD drive, or other drives. The memory 604 may store a process 614 and/or a data 616, for example. The disk 606 and/or the memory 604 may store an operating system that controls and allocates resources of the computer 600.

The bus 608 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 608 can be types including, for example, a memory bus, a memory controller, a peripheral bus, an external bus, a crossbar switch, and/or a local bus.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and other devices. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

Figure 7:
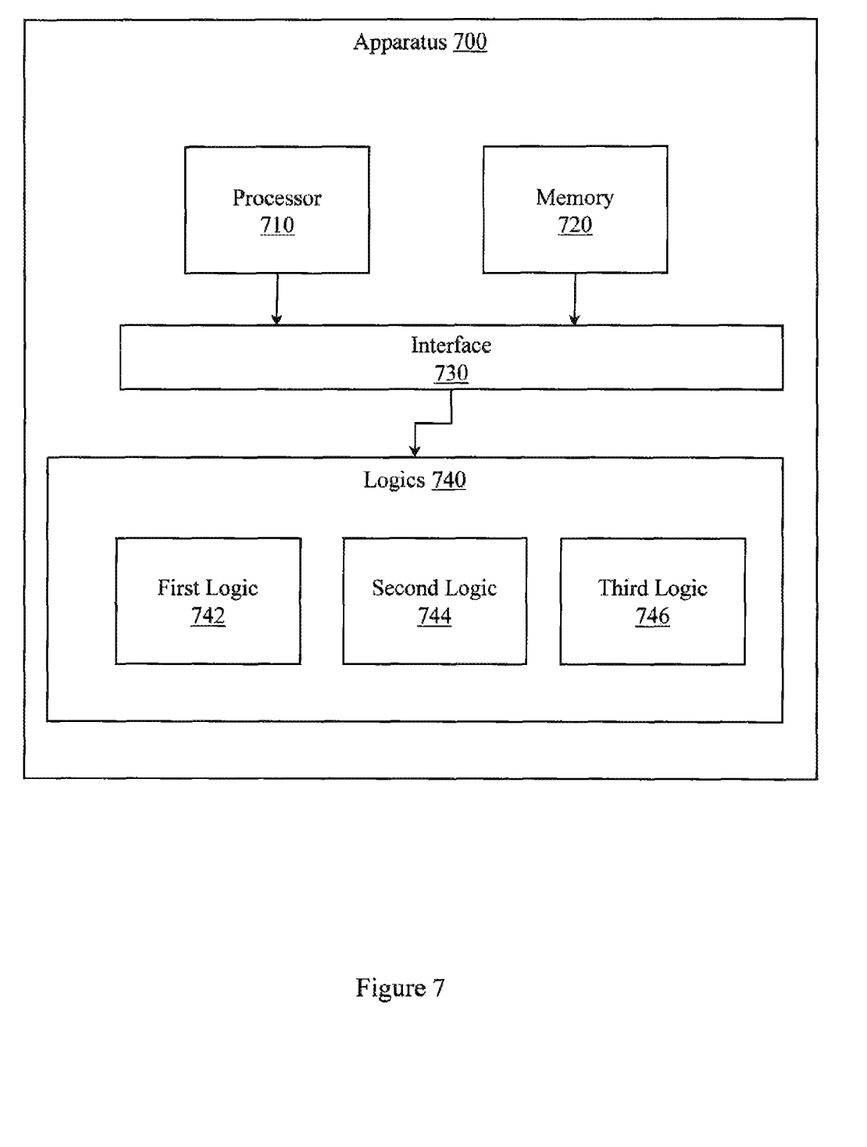
FIG. 7 illustrates an example apparatus associated with object synthesis.

FIG. 7 illustrates an apparatus 700 for performing object synthesis. Apparatus 700 includes a processor 710, a memory 720, a set 740 of logics, and an interface 730 to connect the processor 710, the memory 720, and the set 740 of logics. In one embodiment, apparatus 700 may be a special purpose computer that is created as a result of programming a general purpose computer. In another embodiment, apparatus 700 may include special purpose circuits that are added to a general purpose computer to produce a special purpose computer.

In one embodiment, the set 740 of logics includes a first logic 742, a second logic 744, and a third logic 746. In one embodiment, the first logic 742 is configured to access both a source object and a first organized set of pointers to blocks associated with the source object. In one embodiment, the blocks may have been produced by a de-duplication apparatus or process and are stored in a data de-duplication block data store. The organized set of pointers may be referred to using a tag as a name. A named, organized set of pointers facilitates recreating an object from blocks stored in the data de-duplication block data store.

In one embodiment, the second logic 744 is configured to process both a target object and a second organized set of pointers to blocks associated with the target object. Once again the second organized set of pointers may facilitate recreating the target object from blocks stored in the data de-duplication block data store.

In one embodiment, the third logic 746 is configured to synthesize the target object from the source object. In one example, the third logic 746 synthesizes the target object by controlling the first logic 742 to selectively provide members of the first set of pointers to the second logic 744. The third logic 746 also controls the second logic 744 to arrange and organize pointers provided from the first set of pointers in the second set of pointers.

Apparatus 700 may encounter different conditions while synthesizing a target object. Therefore the third logic 746 may be configured to handle these different conditions. In one embodiment, third logic 746 is configured to react to a condition where a target block needs less than all the data in a block pointed to by a member of the first set of pointers. In one example, the third logic 746 may react by producing a transformed block and providing a pointer to the transformed block to the second logic. Producing the transformed block may include, for example, creating a new block that includes just the data needed by the target block from the source block. Producing the transformed block may also include, for example, manipulating the data that is not needed in the source block to make that data unavailable in the target block. The manipulating may include, for example, physical masking, logical masking, and other manipulations.

The third logic 746 may also be configured to react to a condition where data to be used to synthesize the target object resides in a sparse hole in a data stream. If the presence of a sparse hole is undesirable, then third logic 746 may manipulate one or more block associated with the target object to reduce a size of a corresponding sparse hole associated with the target object. If the presence of a sparse hole is desirable, the third logic 746 may manipulate one or more blocks to preserve and/or enhance the sparse hole.

Third logic 746 may also be configured to provide a new pointer to the second logic 744. The new pointer would be a pointer that is not present in the source object and thus not provided by the first logic 742. Instead of being associated with a source object, the new pointer may be associated with new data processed by the de-duplication apparatus or process. The new pointer may be provided by the third logic 746 upon determining that the target object cannot be synthesized completely from data associated only with the source object, Data other than data available via the source object may be processed because data de-duplication may be ongoing. The ongoing de-duplication may rely on a parse context to establish boundaries, identify blocks, and for other actions. Thus, the third logic 746 may be configured to selectively manipulate a parse context associated with the de-duplication process. The third logic 746 may manipulate the parse context in response to determining that the target object cannot be synthesized completely from data associated with the source object.

Synthesizing a new object from an existing object may change the number of items that are referencing a block. Therefore, in one example, the third logic 746 is configured to manage a life cycle attribute of a block involved in the synthesis of the second object, While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described, Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

Throughout this specification and the claims that follow, unless the context requires otherwise, the words 'comprise' and 'include' and variations such as 'comprising' and 'including' will be understood to be terms of inclusion and not exclusion. For example, when such terms are used to refer to a stated integer or group of integers, such terms do not imply the exclusion of any other integer or group of integers.

What is claimed is:

1. A non-transitory computer-readable medium storing computer-executable instructions that when executed by a computer cause the computer to perform a method, the method comprising:
   controlling the computer to synthesize a target entity from a source entity,
   where the source entity comprises one or more blocks processed by a data de-duplication process and stored in a block repository, where the data de-duplication process is a post-processing data de-duplication process, a storage layout aware data de-duplication process, a storage layout aware cloning process, a storage layout aware replication process, a snapshot/replay process, or a de-duplication defragmentation process,
   where a representation of the source entity comprises a first named, organized collection of references to blocks produced by the data de-duplication process,
   where a representation of the target entity is a second named, organized collection of references to blocks produced by the data de-duplication process, and
   where synthesizing the target entity from the source entity comprises:
      manipulating the representation of the target entity by copying a reference from the representation of the source entity to the representation of the target entity;
      establishing the representation of the target entity by adding to the representation of the target entity zero or more references not found in the representation of the source entity;
      establishing the representation of the target entity by adding to the representation of the target entity at least one reference not found in the representation of the source entity; or
      logically adding to the target entity a block not referred to by the representation of the source entity; and
   selectively manipulating a parse context in use by the data de-duplication process to a first default state, a second state associated with a parse context in use at the time the de-duplication process processed a block associated with the source entity, or a third state that emulates a parse context present before a discontinuity in a target stream, where the parse context comprises a current position in an incident data stream, a rolling hash value, a pre-determined condition being evaluated by the de-duplication process, a pattern being sought by the de-duplication process, or progress towards the pattern being sought.

2. The non-transitory computer-readable medium of claim 1, where the representation of the source entity includes a first list of pointers to blocks stored in the block repository and where the representation of the target entity includes a second list of pointers to blocks stored in the block repository.

3. The non-transitory computer-readable medium of claim 1, the method comprising, upon determining that a source element referred to by a reference to be copied from the representation of the source entity to the representation of the target entity includes data that is not needed in a target element, controlling the computer to create a new block from just the data needed from the source element to synthesize the target element and controlling the computer to provide a reference to the new block for use in synthesizing the target entity.

4. The non-transitory computer-readable medium of claim 3, the method comprising selectively controlling the computer to reparse just the data needed from the source element to synthesize the target element, or controlling the computer to physically mask or logically mask the data that is not needed.

5. The non-transitory computer-readable medium of claim 4, where selectively controlling the computer to reparse just the data needed from the source element is determined as a function of an ingest speed associated with the data de-duplication process, a storage efficiency read-back speed associated with the data de-duplication process, a stability of data being processed by the data de-duplication process, a shape of input/output, resource constraints available during a defined period of time, or resource constraints present at the time of processing.

6. The non-transitory computer-readable medium of claim 5, the method comprising:
   upon determining that a source element referred to by a reference to be copied from the representation of the source entity to the representation of the target entity includes data that is not needed to synthesize the target element,
   controlling the computer to annotate a target reference with information sufficient to logically remove the data from the source element from the point of view of the target element, where the information sufficient to logically remove the data includes start/end information or include/exclude information.

7. The non-transitory computer-readable medium of claim 6, the method comprising:
   upon determining that a source location in a source stream from which data used to synthesize the target entity will be copied is located in a sparse hole, synthesizing the target element so that a sparse hole associated with the target entity will be smaller than the sparse hole in the source stream, or synthesizing the target element so that a sparse hole associated with the target entity will be larger than the sparse hole in the source stream.

8. The non-transitory computer-readable medium of claim 7, the method comprising:
   upon determining that a block in the block repository was involved in synthesizing the target element, selectively managing a life cycle attribute associated with the block.

9. An apparatus, comprising:
   a processor;
   a memory;

a set of logics; and an interface to connect the processor, the memory, and the set of logics, the set of logics comprising:

a first logic that processes a source object and that processes a first organized set of pointers to blocks associated with the source object, where the blocks are stored in a data de-duplication block data store, where the blocks were processed by a de-duplication process, and where the organized set of pointers facilitates recreating the source object from blocks stored in the data de-duplication block data store, where the de-duplication process is a post-processing data de-duplication process, a storage layout aware data de-duplication process, a storage layout aware cloning process, a storage layout aware replication process, a snapshot/replay process, or a de-duplication defragmentation process;

a second logic that processes a target object and that processes a second organized set of pointers to blocks associated with the target object, where the second organized set of pointers facilitates recreating the target object from blocks stored in the data de-duplication block data store; and a third logic that synthesizes the target object from the source object by controlling the first logic to selectively provide members of the first set of pointers to the second logic and by controlling the second logic to arrange the pointers provided from the first set of pointers in the second set of pointers, where the third logic provides a new pointer to the second logic, where the new pointer is not provided by the first logic, and where the new pointer is associated with new data processed by the de-duplication process, and where the new pointer is provided in response to determining that the target object cannot be synthesized completely from data associated only with the source object; and where the third logic selectively manipulates a parse context associated with the de-duplication process in response to determining that the target object cannot be synthesized completely from data associated with the source object, where the parse context includes a current position in an incident data stream, a rolling hash value, a pre-determined condition being evaluated by the de-duplication process, a pattern being sought by the de-duplication process, or progress towards the pattern being sought.

10. The apparatus of claim 9, where the third logic reacts to a condition where a target block needs less than all the data in a block pointed to by a member of the first set of pointers by producing a transformed block and providing a pointer to the transformed block to the second logic.

11. The apparatus of claim 10, where the third logic produces the transformed block by performing one of:

creating a new block that includes just the data needed by the target block from the source block; and manipulating the data that is not needed in the source block to make that data unavailable in the target block, where manipulating the data that is not needed includes physical or logical masking of data in the source object.

12. The apparatus of claim 9, where the third logic reacts to a condition where data to be used to synthesize the target object resides in a sparse hole in a data stream by manipulating a block associated with the target object to manipulate a size of a corresponding sparse hole associated with the target object.

13. The apparatus of claim 9, where the third logic manages a life cycle attribute of a block involved in the synthesis of the second object.

14. A system, comprising:

means for identifying a block in a data de-duplication repository;

means for identifying a reference to a block in a data de-duplication repository;

means for representing a source object using a first named, organized collection of references to blocks in the data de-duplication repository;

means for representing a target object using a second named, organized collection of references to blocks in the data de-duplication repository, means for synthesizing the target object from the source object by manipulating the second named organized collection of references based, at least in part, on data available through the first named organized collection of references, where the means for synthesizing is configured to account for a plurality of conditions, where the plurality of conditions includes:

a condition where a block associated with the target object needs less than all the data in a block associated with the source object, a condition where data to be used to synthesize the target object resides in a sparse hole in a data stream; and a condition where data to be used to synthesize the target object is not present in the source object; and means for selectively manipulating a parse context associated with a de-duplication process in response to determining that the target object cannot be synthesized completely from data associated with the source object, where the parse context comprises a current position in an incident data stream, a rolling hash value, a pre-determined condition being evaluated by the de-duplication process, a pattern being sought by the de-duplication process, or progress towards the pattern being sought.

* * * * *